Nov. 25, 1941.　　　C. W. NORTON　　　2,263,642
JUSTIFYING TYPEWRITER
Filed Oct. 5, 1938　　　10 Sheets-Sheet 1
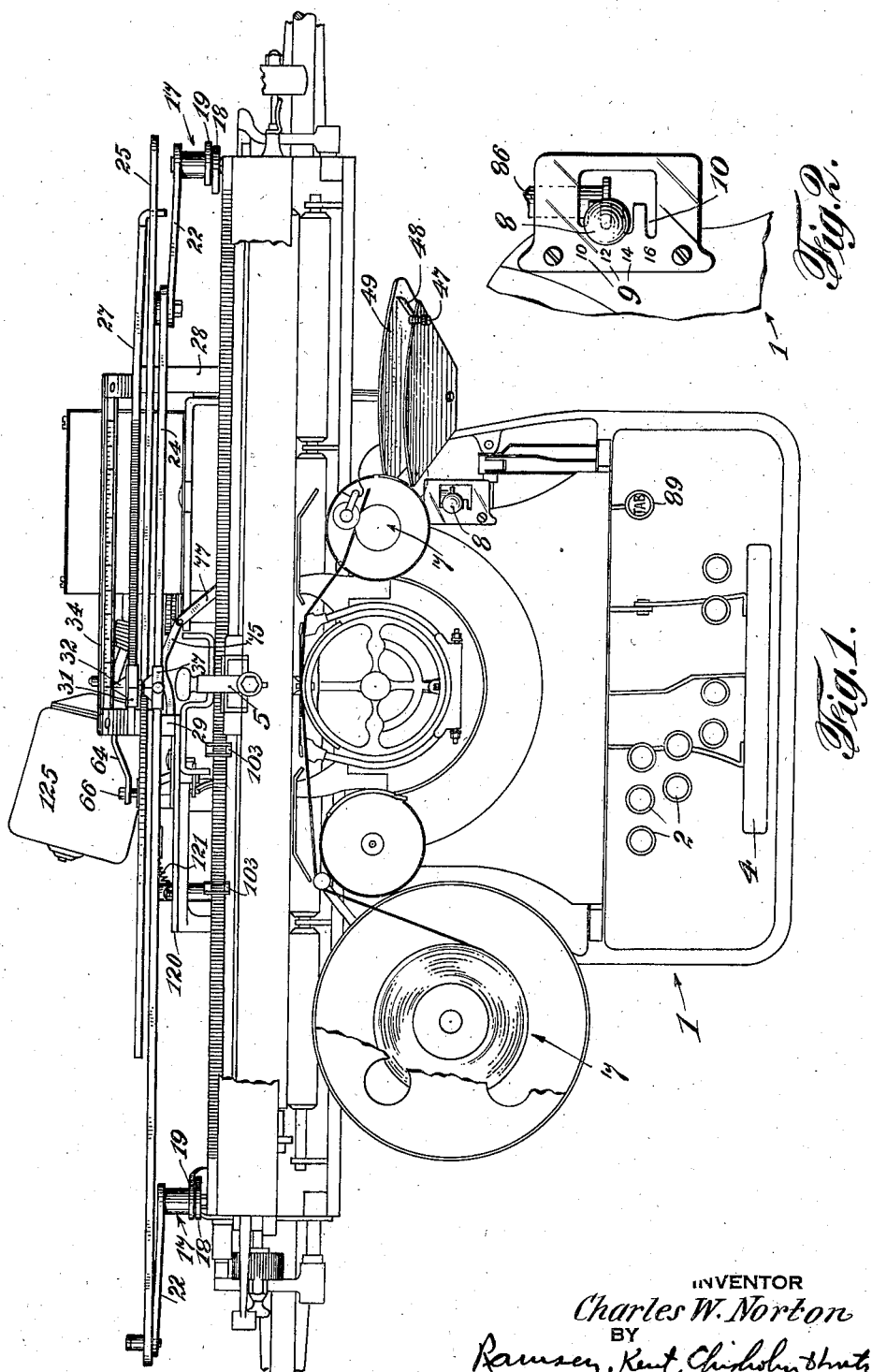
INVENTOR
Charles W. Norton
BY Ramsey, Kent, Chisholm & Hurtz
his ATTORNEYS Nov. 25, 1941.  C. W. NORTON  2,263,642
JUSTIFYING TYPEWRITER
Filed Oct. 5, 1938  10 Sheets-Sheet 2

INVENTOR
Charles W. Norton
BY
Ramsey, Kent Chisholm & Lutz
HIS ATTORNEYS

Nov. 25, 1941.  C. W. NORTON  2,263,642
JUSTIFYING TYPEWRITER
Filed Oct. 5, 1938  10 Sheets-Sheet 4

INVENTOR
Charles W. Norton
BY
ATTORNEYS

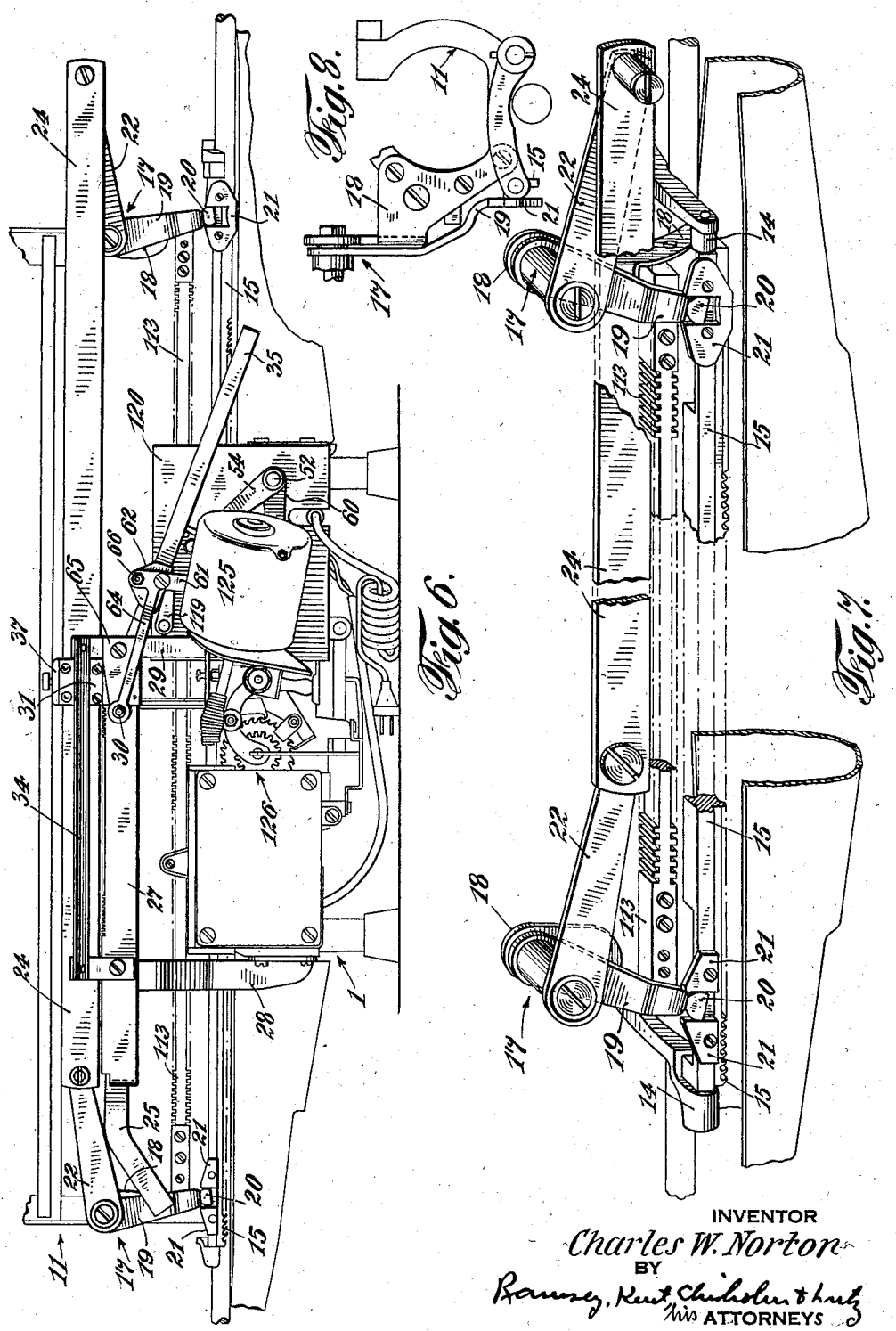

Nov. 25, 1941.  C. W. NORTON  2,263,642
JUSTIFYING TYPEWRITER
Filed Oct. 5, 1938  10 Sheets-Sheet 6

INVENTOR
Charles W. Norton

Nov. 25, 1941.  C. W. NORTON  2,263,642
JUSTIFYING TYPEWRITER
Filed Oct. 5, 1938  10 Sheets-Sheet 7
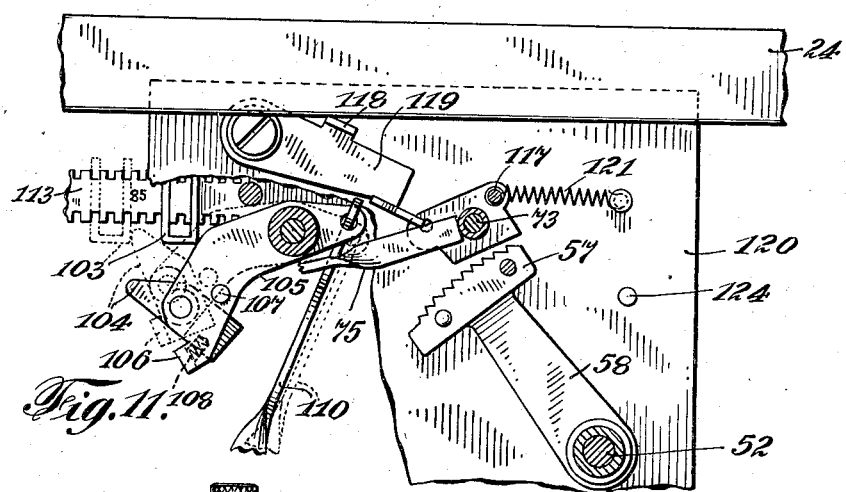
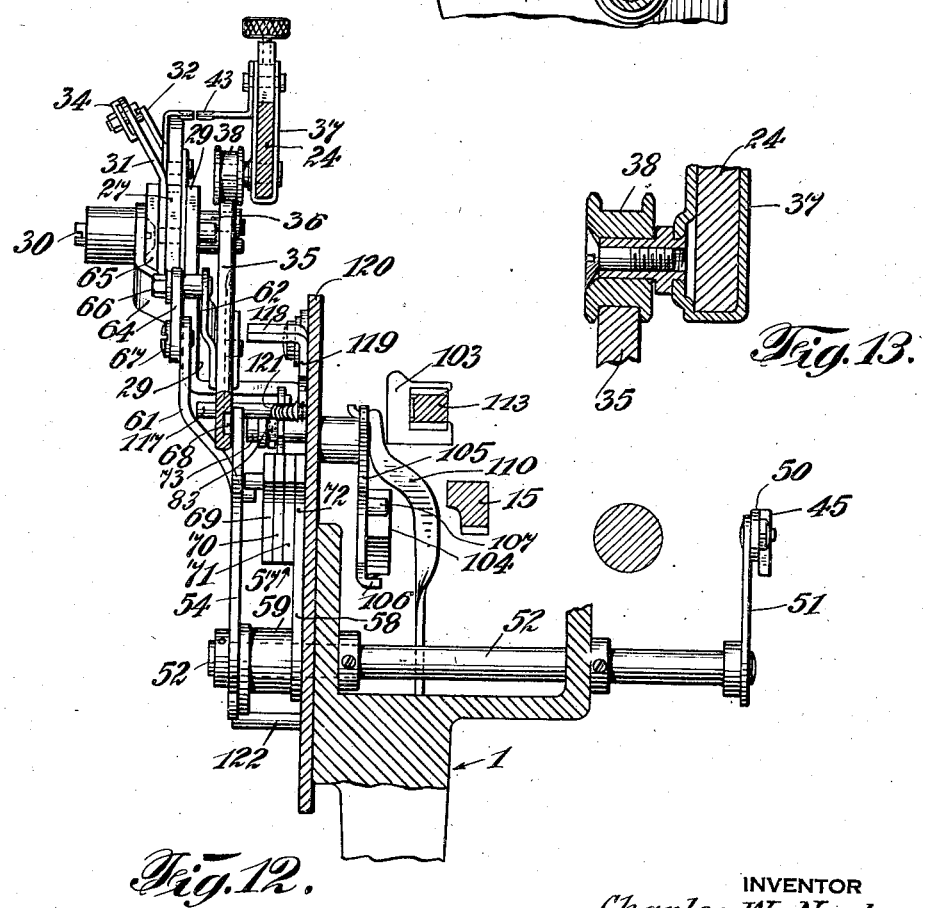
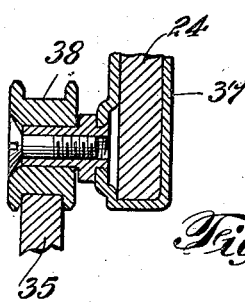
INVENTOR
Charles W. Norton
BY
his ATTORNEYS

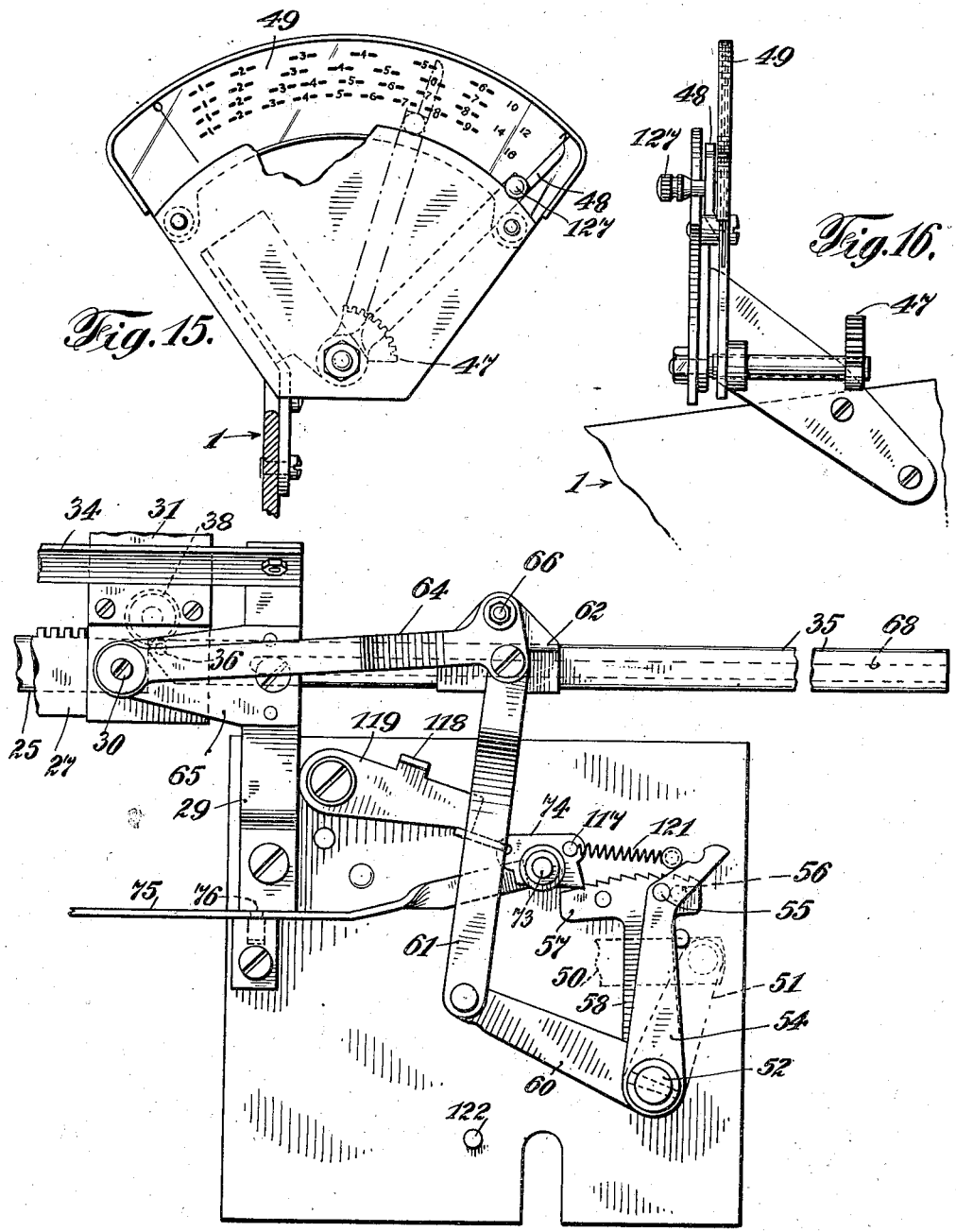

Nov. 25, 1941.  C. W. NORTON  2,263,642
JUSTIFYING TYPEWRITER
Filed Oct. 5, 1938   10 Sheets-Sheet 9

INVENTOR
Charles W. Norton
BY
ATTORNEYS

Nov. 25, 1941.  C. W. NORTON  2,263,642
JUSTIFYING TYPEWRITER
Filed Oct. 5, 1938  10 Sheets-Sheet 10
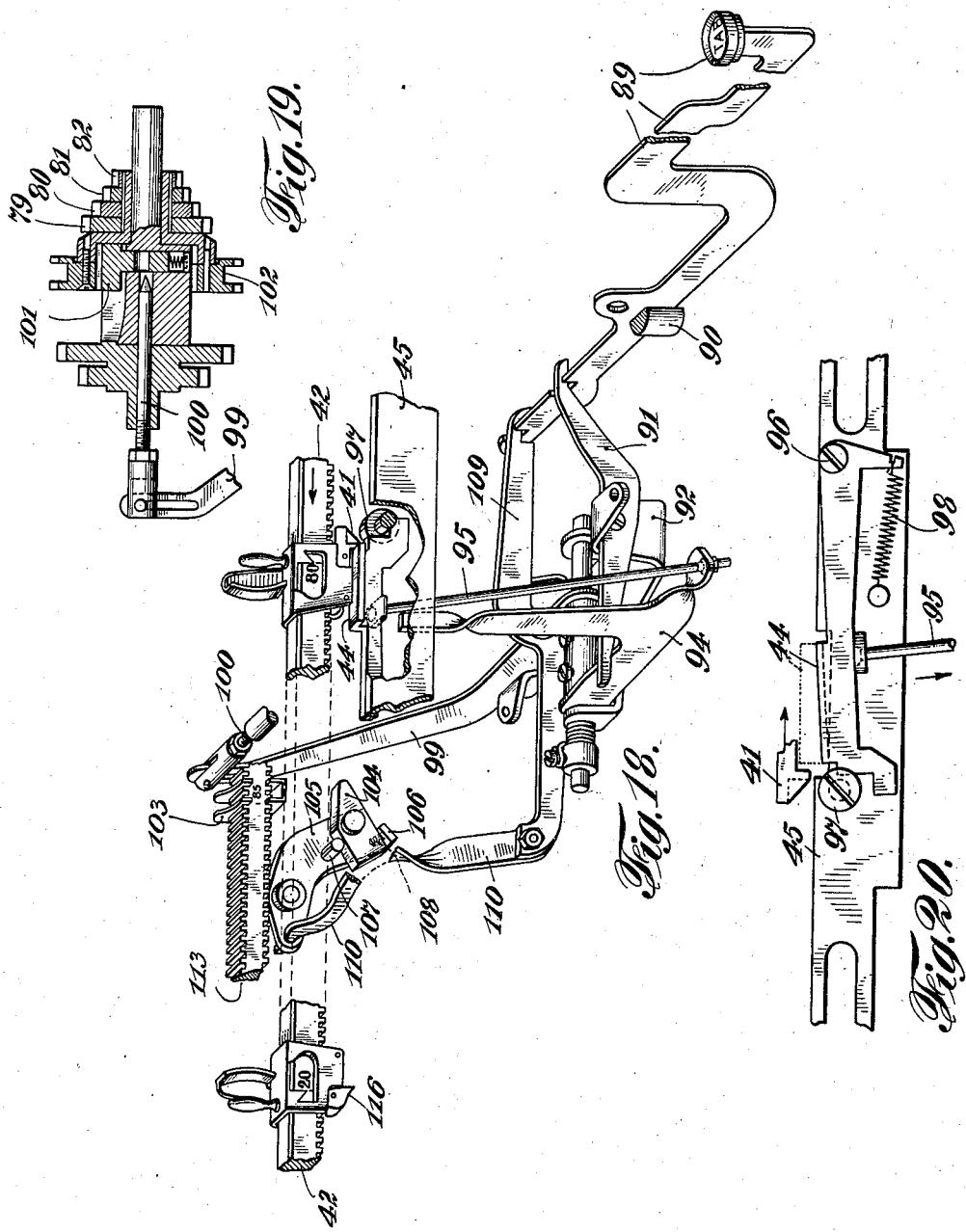
INVENTOR
Charles W. Norton
BY
Ramsey, Kent, Chisholm & Lutz
his ATTORNEYS Patented Nov. 25, 1941

2,263,642

UNITED STATES PATENT OFFICE 2,263,642

JUSTIFYING TYPEWRITER

Charles W. Norton, West Orange, N. J., assignor to Ralph C. Coxhead Corporation, New York, N. Y., a corporation of Delaware Application October 5, 1938, Serial No. 233,365

30 Claims. (Cl. 197—84)

The present invention relates broadly to typewriters and more especially to carriage feed mechanism by which typewritten lines may be justified.

In order to justify a line of typewriting or printing to bring the line to a standard length, it is necessary to know the difference in units between an unjustified line and the standard length constituting the justified line. This information is obtained after the unjustified line has been set up either by the way of type or by typewriting the characters on a piece of paper. When this difference is known, then the amount of necessary space can be added into the line in order to bring the line to the standard length.

In justifying by means of typewriting, it heretofore has been the custom to write a column of unjustified lines to approximately the justified line length and then remove the sheet of paper from the typewriting machine and insert another piece of paper in a typewriting machine equipped for justification and set the machine before each line is written to the characteristic setting required to stretch the line the number of units necessary to produce a column of justified typewriting.

This procedure of the prior art requires the operator to note or calculate the required space units to be added and to set the machine for each line in order that the necessary units will be included in the spacing to bring the line to a standard length. The personal equation of the operator is a primary factor in the prior art method of justifying typewritten lines.

The present invention comprises the utilization of a paper carriage of sufficient width to permit the use of a relatively wide sheet of paper. The unjustified lines are written in a column on the left of the paper. When the end of an unjustified line is being approached, the machine rings a bell, or establishes some other signal, and the operator may then type a few more characters before the ultimate limit is reached. This is the right hand edge margin signal of the ordinary typewriter. When the operator has finished writing the unjustified line, in accordance with the present invention, the operator depresses a tabulator key which automatically releases the carriage so that it may move to the left hand margin of a new or second column at the right of the sheet of paper. The operator now writes the same line over in this second column and the machine automatically justifies this re-written line so that it now extends a standard length. This result is obtained by automatic action of the machine. When the unjustified line is being written, as soon as the signal is given, the machine begins to set the space control so as to control the spacing of the carriage when the typewriting is being done in the second column. Each time the carriage moves a unit in the left hand or unjustified column, after the signal is given, the machine automatically sets the carriage feed for the right hand column, one justification unit less. For example, if the margin signal is set to allow a maximum of eight units to be typed after the signal is given and the line in the unjustified or left hand column is finished when the signal is given, the machine automatically sets the carriage feed for the right hand column (the justified column) so that eight units will be distributed in the line when it is rewritten in the justified or right hand column. If three characters are written in the left hand column after the signal was given, the machine will automatically set the feed for the right hand column so that five characters will be distributed throughout the justified line; and if seven characters are written in the left hand column after the signal is given, the machine will set the feed for the right hand column to distribute one character throughout the length of the justified line. From the foregoing, it will be observed that the writing of the unjustified line in the left hand column automatically sets the feed to justify this same line when it is rewritten in the right hand column. Thus the operator is relieved from any personal calculations or setting of feed mechanism or other personal operations which may introduce errors into the finished product.

Justification may be obtained in several ways, for example, by using a variable unit escapement which may be set to establish different feed units for the typewriter carriage. Another method is to utilize a constant unit escapement and then cause a relative movement between the escapement rack and the carriage so that, for example, each time the escapement has moved a constant distance, the carriage moves this constant distance plus a predetermined increment. The present invention may be applied to either type but preferably is embodied in the latter type of mechanism and comprises the utilization of a carriage to which is attached an escapement rack with a connection between the carriage and the escapement rack under control of a member which cooperates with an inclined plane or sine-bar, so that each time the escapement operates, a justification increment will be included in the carriage movement providing the control member has reached the zone where the sine-bar is effective.

Other and further objects of the present invention will in part be obvious and will in part be pointed out in the specification hereinafter following by reference to the accompanying drawings wherein like characters are used to represent like parts throughout the several figures thereof. It is to be understood that the disclosure is of a construction comprising the preferred embodiment of the invention, but that the invention may be carried out by the use of other structures without departing from the spirit of the invention.

Fig. 1 is a plan view of portions of a typewriting machine embodying the present invention.

Fig. 2 is a plan view of a detail of the lever for changing unit character spacing of the carriage.

Fig. 6 is an elevational view of the justification mechanism looking at the back of the construction illustrated in Fig. 1.

Fig. 7 is a perspective view illustrating details of construction of justification mechanism showing portions in section.

Fig. 8 is an end view of a portion of the paper carriage showing the relation on the justification bell cranks to the paper carriage.

Fig. 11 is a detail view of a ratchet mechanism for the sine-bar taken on line 11—11 of Fig. 9.

Fig. 12 is a sectional view illustrating the sine-bar and ratchet mechanism therefor taken on line 12—12 of Fig. 10.

Fig. 13 is a detailed view of the roller on the control bar.

Fig. 15 is a detailed view of the pointer and character indicator.

Fig. 16 is an end elevation of the construction shown in Fig. 15.

Fig. 17 is a perspective view illustrating the mechanism for controlling the sine-bar when the carriage feed is changed from one basic spacing unit to another.

Fig. 18 is a perspective view of the tabulator key and connected mechanism.

Fig. 19 is a sectional view showing the clutch cooperating with the carriage feed letter space mechanism.

Fig. 20 illustrates the stop mechanism controlled by the tabulator key on the operating bar for operating the sine-bar.

Figure 3:
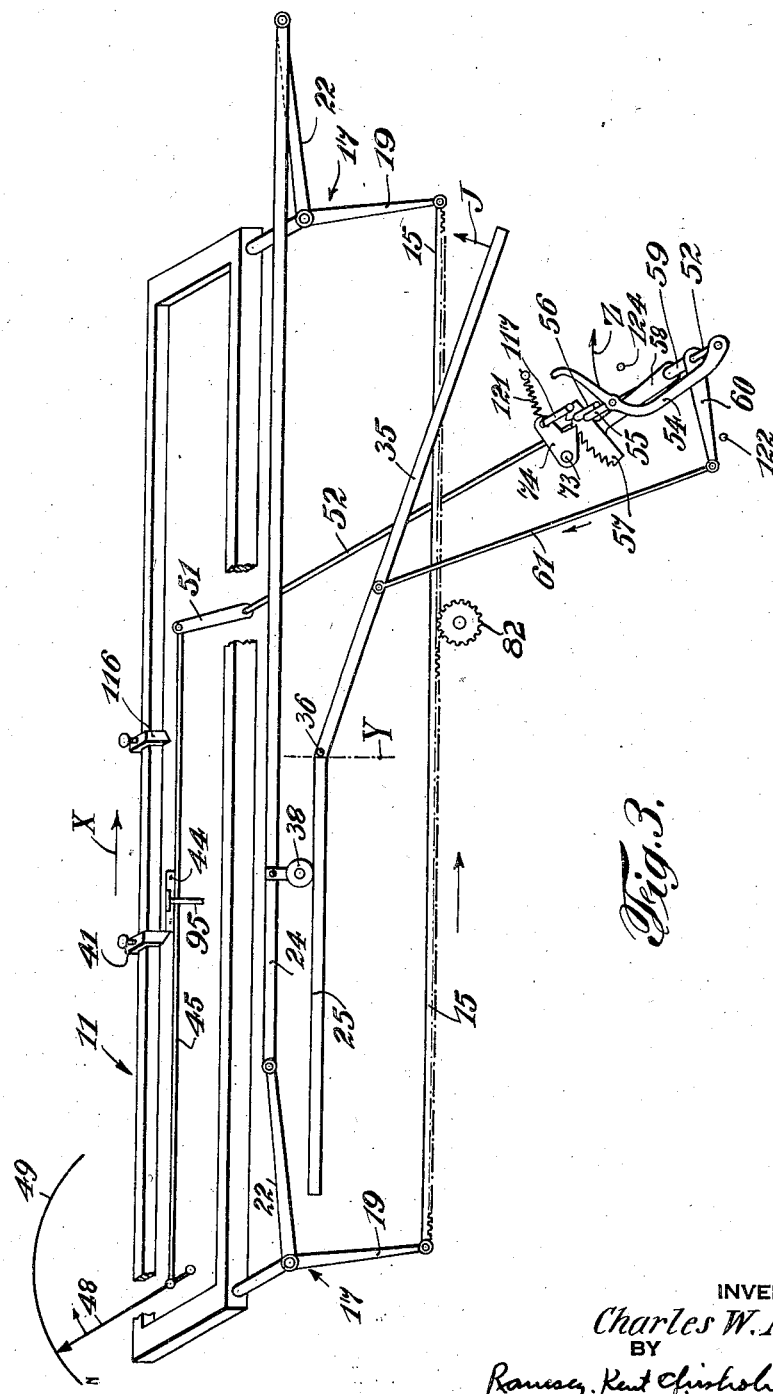
Fig. 3 is a diagrammatic view illustrating the principles of construction of the present invention.

Before going into a detailed description of the mechanism, reference will be made to Fig. 3 which illustrates diagrammatically the mechanism for accomplishing justification in accordance with the present invention. A carriage 11 is movable for letter space movement from left to right (as viewed from the rear of the machine), in the direction of the arrow X. This carriage carries a pair of bell cranks 17, the horizontal arms 22 of which are connected by a control bar 24 and the vertical arms 19 of which are connected to an escapement rack 15. The control bar 24 is provided with a roller 38 that travels upon a track-bar 25 which is parallel to the movement of the carriage 11. A sine-bar 35 is pivoted to the track-bar 25 and forms a continuation thereof so that the roller 38 on control bar 24 travels directly from the track-bar 25 onto the sine-bar 35. Each unit movement of the escapement rack 15, under control of the carriage escapement 126 produces a corresponding movement of the carriage 11 so long as the roller 38 on the control bar 24 remains on the track-bar 25. The roller 38 of the control bar remains on the track-bar 25 throughout the writing of the unjustified line. As soon as the roller 38 on the control bar 24 reaches the sine-bar 35, the control bar drops downwardly a small increment for each advance movement of the roller on the sine-bar. This occurs during the writing of the justified lines. This dropping down or lowering of the control bar 24 causes the same to rotate the bell cranks 17 and thereby causes a relative movement between the escapement rack 15 and the carriage 11 so that the advance of the carriage now becomes the standard unit interval of the escapement 126 plus the increment produced by the rotation of the bell cranks 17 due to the lowering of the control bar 24.

As the carriage 11 moves in the direction of the arrow X, an operating dog 41 on the carriage encounters a block 44 on the operating bar 45, which is connected with a pointer 48 and also with a crank 51 on the shaft 52. The dog 41 contacts the block 44 the moment the signal bell rings. Thus, as the carriage moves with the dog 41 in contact with the block 44 (to write a few characters after the signal), the pointer 48 swings on its axis and the shaft 52 is rotated. The shaft 52 carries an arm 54 provided with a pin 55 which engages a pin 56 on a ratchet head 57, so that movement of the arm 54 in the direction of the arrow Z swings with it the ratchet head 57. This ratchet head 57 is mounted on a sleeve 59 which carries an arm 60 that connects by a link 61 with the sine-bar 35. After the signal bell rings, each step-by-step movement of the escapement rack of the carriage, through the connections described, raises the free end of the sine-bar in the direction of the arrow J. The limit of movement of the sine-bar is when the sine-bar becomes aligned with the track-bar 25 which means that all the letters possible have been written in the unjustified line. In other words, the unjustified line has now reached the length of the standard justified line. Assume, however, that the parts have reached the condition shown in Fig. 3 and the operator has finished writing the unjustified line. The operator now pushes the tabulator key which, through a rod 95, lowers the block 44 out of the path of the operating dog 41 and permits the carriage to move over to the center line Y where the roller 38 on the control bar 24 rests on the end of the sine-bar 35. At this point, the dog 74 holds the ratchet head 57 stationary and holds the sine-bar 35 in the inclined position to which it has been raised.

The operator now rewrites the line of typing and the roller 38 on the control bar 24 travels down the sine-bar 35. The inclination of the sine-bar is such that when the line is finished in the second column, the rewritten line has reached the predetermined justified length.

As the carriage is returned to the left (Fig. 3), the return dog 116 now engages the block 44 and moves the operating bar 45 toward the left. This causes the shaft 52 to turn counter-clockwise and to carry the end of the arm 54 into engagement with the pin 117 on the dog 74 to raise the same and release the dog 74 from the ratchet head 57. As soon as this occurs, the weight of the sine-bar pushing downward on the rod 61 turns the arm 60 until it contacts with the stop 122 and the sine-bar has dropped to its lowest position where it stands beyond the extreme limit of justification permitted in the machine. The parts are now ready for the operator to write a second unjustified line, at the end of which the sine-bar has been raised to the necessary angle required to justify the second line when it is rewritten in the right hand column. These operations are continued for each line desired in the justified column.

The present invention is illustrated and described as being embodied in a typewriting machine known in the art as the "Varityper," which is a key wheel type of machine utilizing type shuttles on which different alphabets are provided so that the machine is capable of typewriting in alphabets of different characters and in letters and characters of different sizes. To this end, the machine is provided with a carriage escapement capable of being adjusted to provide different length character spacing for characters of different alphabets in accordance with the variable feed mechanism described in the patent to Trego No. 1,918,299, July 18, 1933.

Referring to Fig. 1, the typewriting machine comprises a frame 1 in which are mounted the usual character keys 2 which, because of their well known function in the art, are illustrated diagrammatically, and a space bar 4. The character keys control the setting of the type, the operation of the printing hammer 5, and the escapement for the paper carriage. Suitable ribbon mechanism 7 is provided to furnish the pigment for making the character impression. The machine, in other words, is a complete typewriting machine of the type well known in the art, and specific details of a general typewriting machine are, therefore, well known and need not be described in detail.

The carriage feed, as above explained, is a multiple feed capable of having four distinct character spacings, and Fig. 2 illustrates a lever 8 and a dial 9 for controlling the carriage feed. The lever 8 may be set in any one of the four notches 10 to cause the carriage to move one-sixteenth, one-fourteenth, one-twelfth, or one-tenth of an inch (as indicated on the dial 9) for each carriage letter space, dependent on the position of the lever 8 relative to the notches 10.

Figure 5:
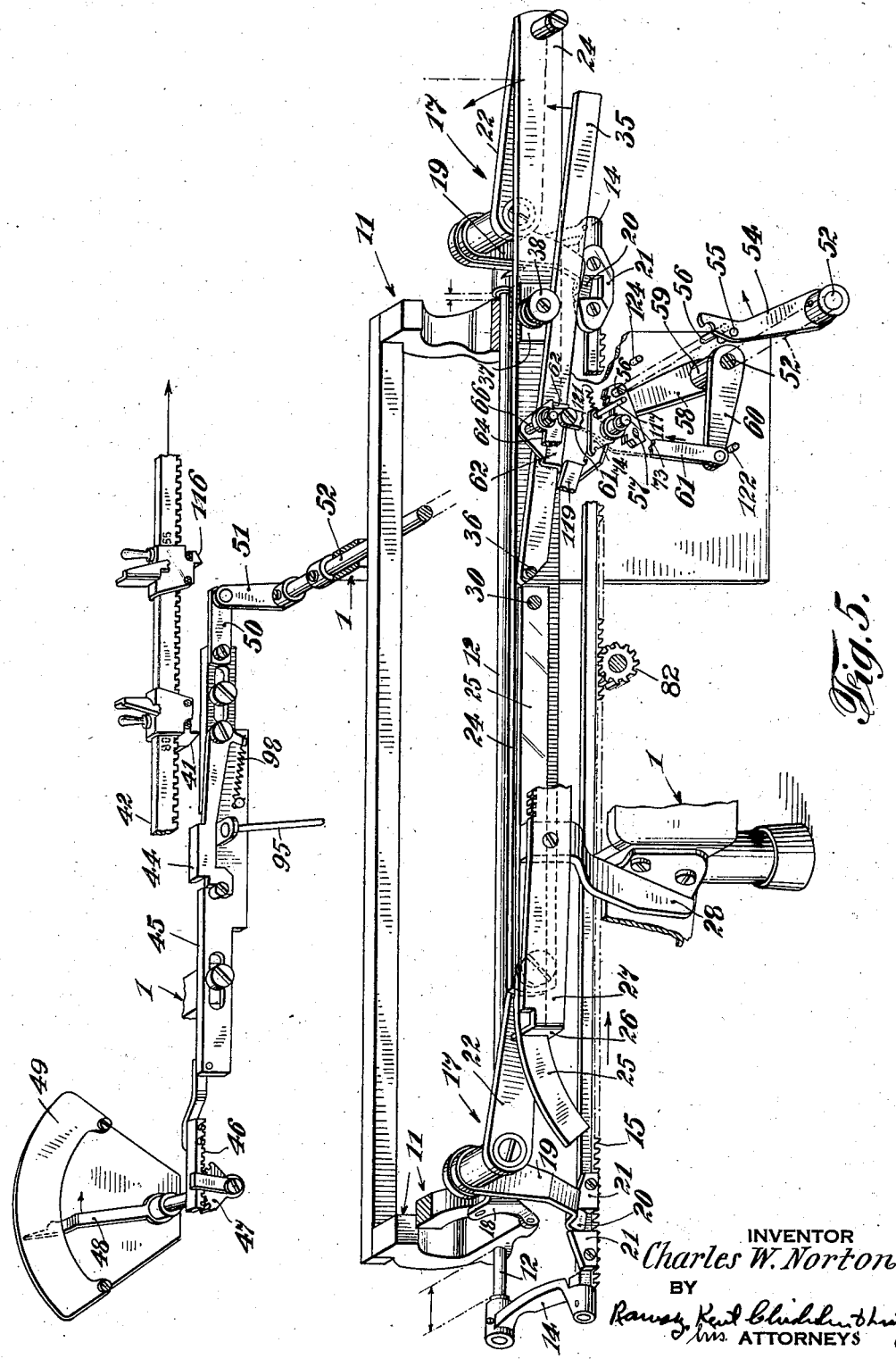
Fig. 5 is a perspective view illustrating the mechanism whereby justification of the typewritten line is accomplished with unessential mechanism omitted and with certain parts in section.

Referring now more especially to Fig. 5, which is a detail view looking from the back of the machine toward the front thereof, this Fig. 5 illustrates a carriage frame 11 in which is slidably mounted a rod 12 that is provided with rearwardly extending arms 14 which carry an escapement rack 15 that is in engagement with a pinion 82 which is controlled by the escapement mechanism, hereinafter to be described. The escapement rack 15, therefore, is capable of sliding movement relative to the paper carriage frame, and is attached to the paper carriage frame (see also Figs. 6, 7, and 8) by means of bell crank levers 17 which are mounted on brackets 18 secured to the carriage frame 11 with the downwardly extending arms 19 terminating in heads 20 that are provided with opposing circular curved surfaces which are both rotatable and slidable between blocks 21 secured to the escapement rack 15. The substantially horizontal arms 22 of the bell cranks 17 are connected by a control bar 24 so that when the control bar 24 is raised or lowered, the bell cranks 17 are rotated on their axes and cause a relative movement between the escapement rack 15 and the paper carriage frame which is mounted for reciprocal movement in the main frame 1 of the typewriter, as is common practice in the typewriter art.

A track-bar 25 is slidably mounted for adjustment with one end extending through a slot in a right angle end 26 of the notched bar 27 that is fixedly mounted by suitable brackets 28 and 29 on the machine frame 1. The other end of the track-bar 25 is carried by a rivet 30 (Fig. 5) which extends from an adjustment sleeve 31 (Figs. 9 and 10) which is provided with a pointer 32 that cooperates with a scale 34. The adjustment sleeve 31 is provided with a suitable dog (not shown) which cooperates with the notched bar 27 to permit the track-bar 25 to be set in adjusted positions relative to the scale 34 for the purpose of determining the column widths, as will be hereinafter explained.

Figure 9:
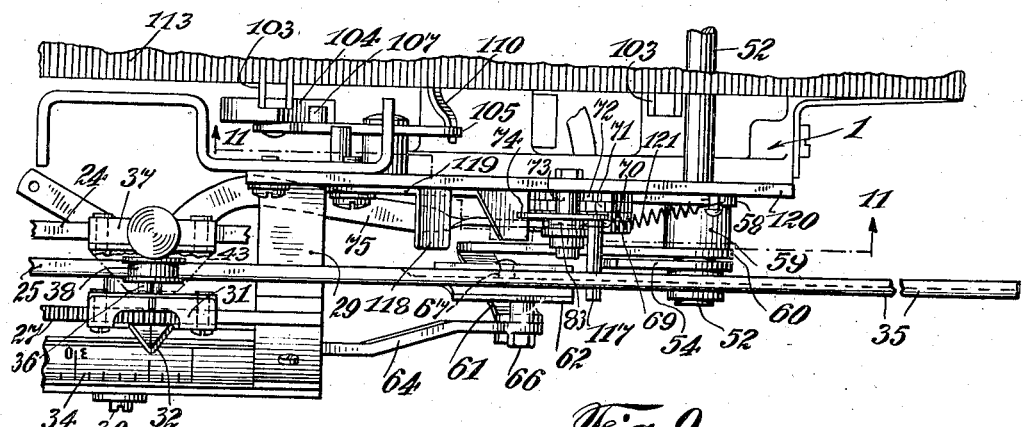
Fig. 9 is a plan view illustrating details of mechanism for controlling the justification sine-bar.
Figure 10:
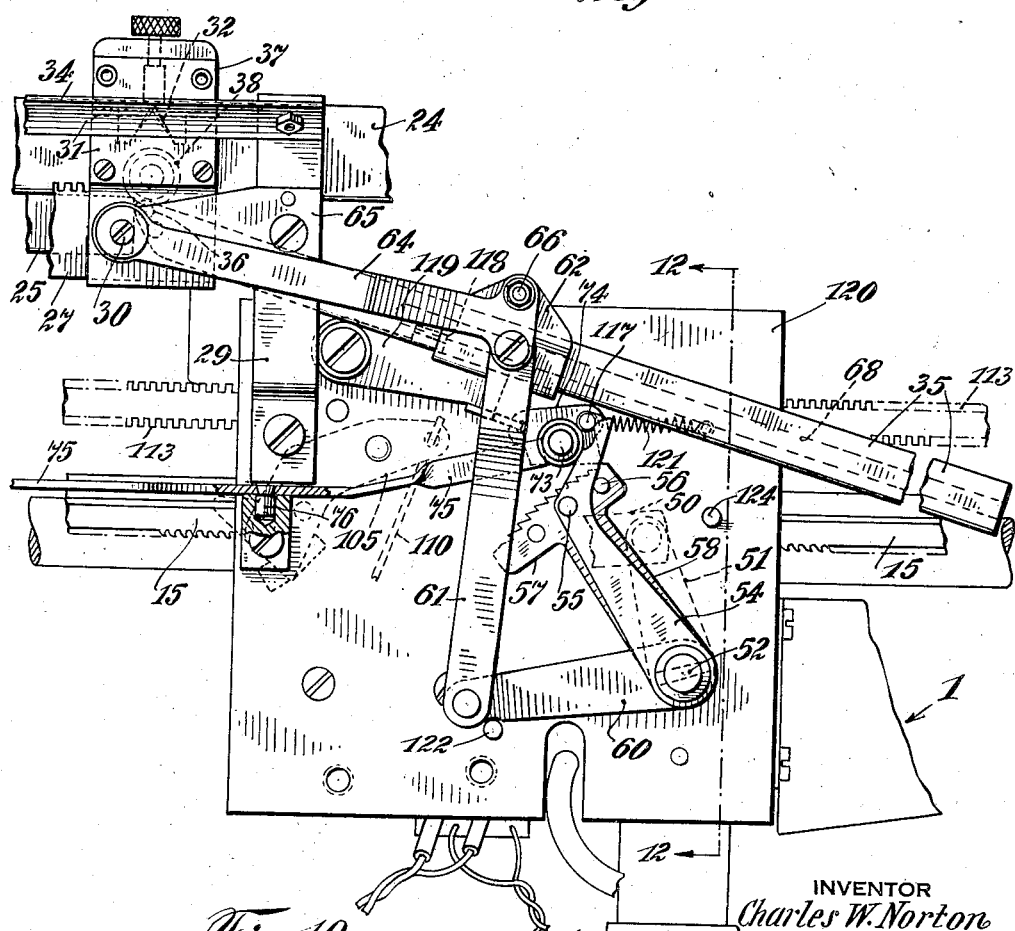
Fig. 10 is an elevational view of the mechanism shown in Fig. 9.

A sine-bar 35 is pivoted at 36 to the sleeve 31 directly opposite to the pointer 32 so that the setting of the pointer 32 relative to the scale 34 indicates the position of the axis of the pivot 36 relatively to the scale 34. A clamp sleeve 37 is mounted for slidable adjustment on the control bar 24 and carries a roller 38 (Figs. 9, 10, 12, and 13) which rides upon the upper edge of the track-bar 25 and the sine-bar 35. The adjustable setting of clamp sleeve 37 on the control bar 24 determines the position of the left hand margin of the justified column relatively to the paper carriage and to this end, the clamp sleeve 37 is adjusted opposite to the pointer 32 on the adjustment sleeve 31 as shown in Figs. 9 and 10.

The sine-bar 35 may be swung in a vertical direction around the pivot 36 to various degrees of inclination. It will be observed that as the roller 38 travels down the sine-bar 35, when the carriage escapes from left to right (as viewed from the back of the machine), the control bar 24 is gradually lowered and as the control bar lowers, the carriage is advanced a slight increment in addition to the normal character space, each time a character is typed or a space is provided between words.

Figure 4:
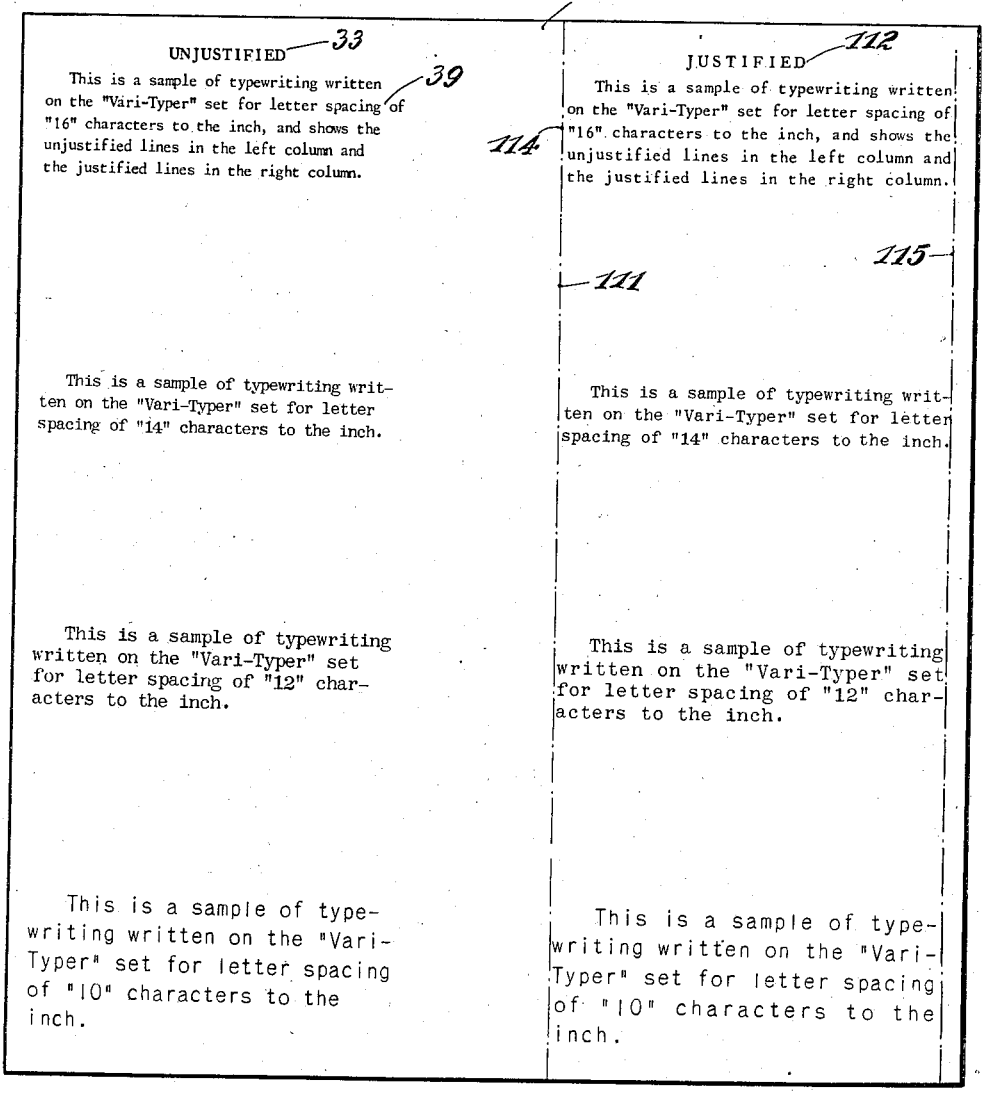
Fig. 4 illustrates a sheet of paper on which have been written an unjustified column at the left and a justified column at the right.

When an unjustified line 39 (Fig. 4) is being written on the sheet of paper 40, the roller 38 is travelling on the horizontal track-bar 25. A signal is given when the end of the written line is being approached. The operator may type a few characters after the signal to complete the unjustified line. When the signal is given, the roller 38 is on the track-bar 25 and the sine-bar 35 is in its lowest angular position. As the operator spaces the carriage or types a character after the signal is given, the sine-bar is automatically swung upwardly by a mechanism that will now be described.

When the signal is given, an operating dog 41 on the justifying bar 42 (Figs. 3, 5, 18, and 20) has engaged a block 44 on the operating bar 45 which is slidably mounted in the machine frame 1. One end of the operating bar carries a rack 46 which cooperates with a gear segment 47 to swing the pointer 48 over the indicator scale 49. The other end of the operating bar is connected by a link 50 with a crank arm 51 which is fixedly mounted on a shaft 52 that is rotatably mounted in the machine frame 1. The rear end of this shaft has an upwardly extending arm 54 fixedly mounted thereon. This arm 54 is provided with a pin 55 (Figs. 5, 10, and 14) which is adapted to contact with a pin 56 on a ratchet head 57. The ratchet head 57 comprises an arm 58 rigidly attached to a sleeve 59 that is rotatable upon the shaft 52 and this sleeve carries an arm 60 which is connected by a link 61 with a guide sleeve 62 through which the sine-bar is slidably movable when the adjustable sleeve 31 is moved relatively to the scale 34. This guide sleeve 62 is held in position by an oscillating link 64 (Figs. 10 and 14) that is pivoted to a bracket 65 carried by the main frame and is pivoted at its forward end at 66 to the guide sleeve 62. The guide sleeve 62 carries a pin 67 (Fig. 17) which slides in a groove 68 in the sine-bar 35 so that the sine-bar may not jump out of the open sleeve 62. As the sine-bar 35 is raised or lowered, the oscillating link 64 retains the guide sleeve in its proper position so that when the link 61 is raised or lowered, it correspondingly raises or lowers the sine-bar.

The ratchet head 57 is provided with four sets of ratchet teeth 69, 70, 71, and 72. These sets of ratchet teeth correspond respectively to the setting of the carriage control lever 8 in one of the four notches for controlling the unit carriage feed. A holding dog 74 is adapted to cooperate with any one of the sets of ratchet teeth and the relation of the holding dog 74 to a particular set of ratchet teeth is controlled by the setting of the carriage feed control lever 8 as will now be pointed out with reference to Fig. 17. The dog 74 is pivoted to oscillate on stud 73 (Figs. 9, 11, and 14) mounted on the plate 120 and the end of a lever 75 (Fig. 11) extends into a groove 83 (Fig. 9) to shift the dog 74 on the stud 73. The lever 75 is pivoted at 76 to the machine frame and is connected by a link 77 with the shift lever 78 which cooperates with the four pinions 79, 80, 81, and 82 that may be selectively engaged with the escapement rack 15 to control unit distance movement of the carriage when the escapement operates. The shift lever 78 is pivoted at 84 to the machine frame and is connected by means of a pivot screw 85 to the shift rod 86 which is slidably mounted in the machine frame and carries the escapement control lever 8. From the foregoing, it will be seen that as the control lever 8 for the escapement is moved to shift the escapement from one letter space standard to another, the dog 74 is shifted to engage the set of ratchet teeth corresponding to the particular carriage feed setting. This shifting movement is done when setting up the machine before typing is begun, and should be done when the pointer 48 sets on "N" of the dial 49, because at this time, the dog 74 is out of engagement with the sets of ratchet teeth 69, 70, 71 and 72. In order to insure that the shifting of the carriage feed may not be changed when the pointer 48 is in any position other than at "N," the shift rod 86 (Fig. 17) carries locking segments 87 and the operating bar 45 carries a locking plate 88 which moves into engagement between the locking segments 87 as soon as the operating dog 41 in engagement with the block 44 on the operating bar 45 has moved the operating bar 45 endwise.

When the signal bell has rung, as the operator is typing the unjustified line, and the operator writes a few characters, as has been explained, the operating dog 41, through the block 44, has moved the operating bar 45 endwise and through connected parts, has swung the ratchet head 57 beneath the dog 74 which engages an advanced notch each time the carriage escapes one character space, and through the link 61, the sine-bar is swung slightly in an upward direction. This movement continues as long as the operator causes the carriage escapement to operate after the signal bell has rung and within the limits permitted as to the number of characters which may be written after that time. When the operator has finished the unjustified line, the dog 74 retains the ratchet head 57 in its locked position and thus retains the sine-bar at the angle to which it has been raised.

The machine is equipped with tabulating mechanism in accordance with Trego Patent No. 1,964,748, July 3, 1934. When the operator has finished writing the unjustified line, the operator depresses the tabulating key 89 (Fig. 18). This key 89 is pivoted in the main frame on the pivot block 90 so that when the key is depressed, the back end of the lever is raised. A cross lever 91 is pivoted on a bracket 92 which is secured to the main frame and bears upon the front arm of a bell crank lever 94. The front end of this bell crank lever carries a rod 95 which connects with the block 44 that is mounted on a pivot screw 96 (Fig. 20) carried by the operator bar 45. This pivoted block 44 is normally urged against a stop screw 97 by the spring 98. When the tabulator key is depressed, the cross lever 91 operating on the forward arm 94 of the bell crank lever pulls downwardly on the rod 95 and pulls the block 44 out of engagement with the operating dog 41 which is adjustably mounted on the justifying bar 42. At the same time, the rearwardly extending arm 99 of the bell crank pushes the release pin 100 (Fig. 19) into the dog 101 to disengage the same from the rack pinion block 102, to which the pinions 79, 80, 81, and 82 are splined. (See Trego Patent No. 1,964,750, July 3, 1934.) The carriage is now free to move under the carriage spring and tabulates to the position where the stop 103 engages the tabulating dog 104 (Figs. 11 and 18). This tabulating dog 104 is mounted on a swinging arm 105 which is pivoted to the main frame. The dog 104 may oscillate between the stops 106 and 107 which are mounted on the swinging arm 105 and is normally held in engagement with the stop 107 by the coil spring 108. When the tabulator key 89 is depressed, a cross lever 109 pulls downwardly a link 110 connected to the swinging arm 105 and lifts the tabulating dog 104 into the path of the stop 103. Since, as previously explained, at this time the carriage is free to move under the carriage spring, it will move until the stop 103 contacts with the tabulating dog 104 and brings the dog to rest against the stop 107. The tabulating stop 103 has been set so that the carriage has moved the roller 38, carried by the control bar 24, to the position shown in Figs. 9 and 10 so that the carriage has moved to the position corresponding to the left hand margin line 111 of the justified column 112 on the paper sheet 40.

The operator now rewrites the unjustified line 39 as justified line 114. This is accomplished due to the fact that as soon as the operator begins to write after tabulating, the roller 38 moves downward on the sine-bar 35 for each unit movement of the carriage and since this sine-bar is held in its adjusted position by the holding dog 74, in engagement with the proper set of ratchet teeth on the ratchet head 57, the carriage advances the proper character space plus the increment produced by the downward movement of the control bar 24 which swings the bell crank levers 17 and causes the paper carriage 11 to move a slightly greater distance than the movement allowed the escapement rack 15. When the operator has finished rewriting the unjustified line 39, this line terminates at the right of the justified column 112 at the right hand margin line 115, which is a vertical line for the right hand end of each justified line.

Figure 14:
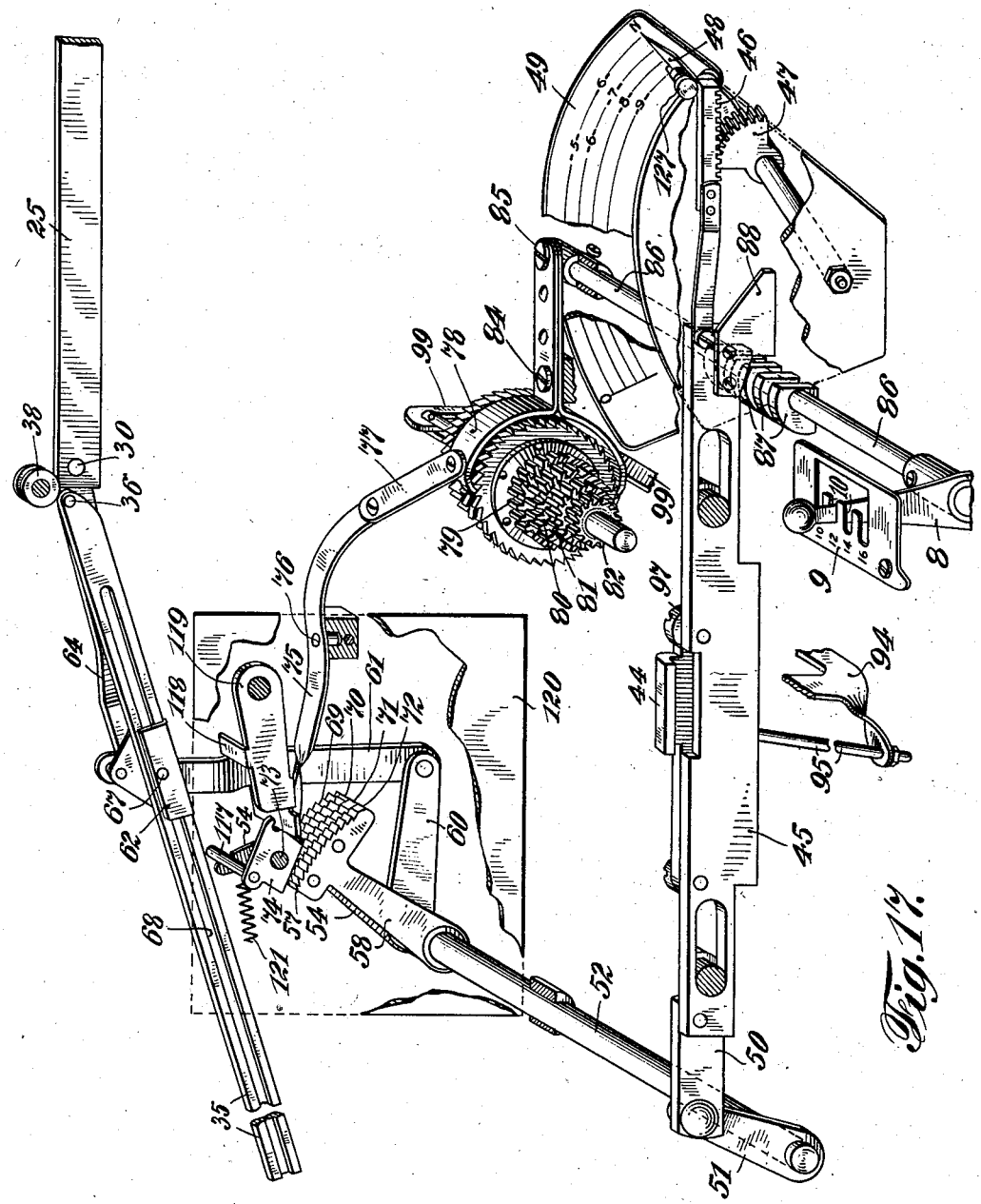
Fig. 14 is a detailed view of the sine-bar and ratchet mechanism for controlling the same.

After the justified line 114 has been written, the operator returns the paper carriage to its right hand position (viewed from the front of the machine) to begin writing a new unjustified line. As the operator returns the carriage, a return dog 116 on the rack bar 42 engages the block 44 (Fig. 5) and moves the operating bar 45 with the carriage. When this occurs, the rack 46 cooperating with the gear segment 47 swings the pointer 48 to the starting position as shown in full lines in Fig. 15. The movement of the operating bar to the left (Fig. 5) turns the shaft 52 counter-clockwise and swings the upwardly extending arm 54 to cause the upper end thereof to engage a pin 117 on the holding dog 74 (Figs. 5, 12, and 14). The upper end of the lever 54 cams pin 117 upwardly and releases the dog 74 from the ratchet teeth on the ratchet head 57. When this happens, the weight of the pivoted sine-bar causes the bar to drop to its lowest or greatest inclined position. As the bar drops, it swings the ratchet head 57 counter-clockwise due to the downward pressure on the link 61 operating through the arm 60, the sleeve 59, and the arm 58 which carries the ratchet head 57. In its lowest position, the control bar rests on a shelf 118 on the release arm 119 which is pivoted on the plate 120 and is connected with the dog 74 to hold the coiled spring 121 stressed and retain the holding dog 74 out of engagement with the ratchet head 57. The downward movement of the sine-bar is stopped by the arm 60 contacting with the stop pin 122. A stop pin 124 is located in the path of the arm 58 which carries the ratchet head 57 to limit the movement of the ratchet head and to stop the carriage from further movement if the operator attempts to write beyond the number of characters permitted after the signal bell has rung. When the arm 58 contacts the stop pin 124, the shaft 52 is no longer permitted to rotate and the operating bar 45 is held stationary with the operating dog 41 in engagement therewith and since this dog is carried on the justifying rack bar 42 which is mounted on the paper carriage, the paper carriage can no longer move.

In order that the operator may know how many characters may be written after the signal bell has rung, the pointer 48 moves over the indicator scale 49. It will be observed that there are four sets of numerals provided on the indicator scale 49. These four sets of numerals correspond to the carriage space units for which the carriage control lever 8 may be set and the operator reads the correct set of numerals on the indicator that agrees with the setting of the lever 8. For example, assume the bell has rung and that the pointer 48 is in the dotted line position (Fig. 15) and that the operator has the carriage control lever 8 set in the twelve notch as indicated in Fig. 17. This is the second row of figures on the indicator scale 49 and shows the operator that six more characters only can be written in the unjustified line. Each time a character is written, or the space bar is operated to permit carriage movement, the pointer 48 moves one step counter-clockwise (Fig. 15) and indicates the number of letters that may still be written for the particular setting of the carriage movement.

It sometimes happens that a short line occurs, as at the end of a paragraph, when the operator is writing in the unjustified column. It is desirable that such short lines should be written with normal spacing in the justified column. Since the short line is completed before the signal bell rings, the sine-bar is standing in its lowest position to introduce maximum justification space, if the carriage is tabulated to cause the typing to occur in the justified column.

In order to enable the operator to write the short line in the justified column with normal spacing the pointer 48 is provided with a finger knob 127 (Fig. 15) whereby the operator may manually move the pointer 48 counter-clockwise. This positive movement of the pointer 48 moves the operating bar 45 (Fig. 5) to turn the shaft 52 and through the connected parts to cause the link 61 to raise the sine-bar 35 in exactly the same manner as if these movements were brought about automatically. If the operator moves the pointer 48 counter-clockwise to the "0" position on the left of the indicator scale 49, the sine-bar 35 will be horizontal and will constitute a straight line continuation of the track-bar 25 so that any typing in the justified column 112 will be written with normal spacing, that is, with the same spacing that the line had when written in the unjustified column. When the carriage is returned to again permit typing in the unjustified column, the parts act to restore the sine-bar to its lowest position exactly the same as if the sine-bar had been raised automatically by operation of the machine instead of having been raised positively by the operator.

Before typing is begun, it is desirable to set the machine for the work to be done. This means determining the length of lines, and the positions of the columns on the paper carried by the paper carriage. Preferably, the dog 41 (Figs. 3, 5, and 18) is set first, and this setting is, preferably, near the center of the scale on the rack bar 42. The dog 41 operates the bell signal (see U. S. Patent 1,963,158, June 19, 1934), and shortly thereafter contacts with the block 44 (Fig. 5). The setting of this dog 41 therefore indicates the right end of the unjustified line 39. The dog 116 is preferably set next in order. This dog 116 contacts with the block 44 on the return movement of the carriage and moves the operating bar 45 to normal position where the carriage is stopped on its return movement. Thus the setting of the stop 116 determines the position of the left hand margin of the unjustified lines 39. The distance on the scale on the rack-bar 42 between stops 41 and 116 is the measure of the length of the justified lines 114, and as shown on Fig. 5, this distance is twenty-five (25) units, or two and one-half inches. The tabulator stop 103 is set on the tabulator bar 113 about five units above the setting of dog 41 on bar 42, thus if the dog 41 is set at "80" on the scale, tabulator stop 103 will preferably be set at "85". The difference in setting between the dog 41 and the tabulator stop 103 determines the space between the column 33 of unjustified lines and the column 112 of justified lines. The adjustment sleeve 31 is now set so that the pointer 32 is opposite the "25" mark on the scale 34. This means the distance between the pivot 36, for the sine-bar and the pivot 66 of the guide sleeve 62 for the sine-bar, is twenty-five units, or two and one-half inches, which corresponds to the distance between dogs 41 and 116 that have previously been set. The reason for this corresponding setting is that justification on the sine-bar should occur only between pivots 36 and 66. (In Fig. 5, the roller 38 has been moved to an abnormal position on the sine-bar.) The tabulator key 89 (Fig. 18) is operated and the carriage is stopped by the engagement of stop 103 with the dog 104. While the carriage stands in this position sleeve 37 (Figs. 9, 10 and 12) is adjusted on the control bar 24 so that indicator 43 (Fig. 12) on sleeve 37 is aligned with pointer 32 on adjustment sleeve 31. The machine is now set for operation wherein the width of the justified column 112 will be two and one-half inches and the space between the unjustified column 33 and the justified column 112 will be five units or one-half of an inch. It will be observed that the setting of the adjustment sleeve 31 is along the bar 27 that is fixedly mounted to extend parallel to the travel of the paper carriage 11. When the adjustment sleeve 31 is adjusted along the bar 27, the sine-bar 35 is slid through the guide sleeve 62, and the initial angle of the sine-bar 35 to carriage travel path is changed. This automatically corrects the justification increment for different length of lines, for example, if the justified line is two and one-half inches long and one unit is to be distributed throughout this line, the proper adjustment as above described of the adjustment sleeve 31 automatically distributes this one unit throughout the total length of the line. If the justified line is four inches long and one unit is to be distributed, the setting of the adjustment sleeve 31 opposite the "40" on the scale 34 (assuming the other elements and stops are properly set) will set the sine-bar 35 so that one unit will be distributed throughout the four inch justified line. Thus it will be seen that the basic inclination of the sine-bar is automatically changed for each length of line by the setting of the sleeve 31.

The purpose of writing the unjustified column by this machine is to set the machine so as to automatically produce the justified column when the subject-matter of the unjustified column is rewritten line for line in the justified column, immediately after each line is written in the unjustified column. When a work sheet has been completed, the sheet of paper may be severed, to separate the justified column from the unjustified column. The justified column may then be used as a part of a "Make-ready" which may be reproduced by photolithography, or other printing method, for any purposes desired.

The machine is equipped with a suitable electric drive 125 (Fig. 6), suitable escapement mechanism 126, and other parts necessary to complete the mechanical construction of the "Varityper," which is well known in the art. The escapement mechanism, while capable of imparting or allowing rotative movement to the escapement shaft and to the gears 79, 80, 81, and 82, is fixedly mounted against movement laterally. Consequently, many parts of this machine are omitted from the drawings in order to more clearly illustrate the particular features of the present invention.

What I claim is:

1. In a typewriting machine, a paper carriage, a carriage escapement mechanism for said carriage, said escapement mechanism being settable to operate at different letter space intervals, justification mechanism to permit said carriage to move relatively to said escapement mechanism, settable means for said justification mechanism comprising a settable member for each different letter space interval of the escapement mechanism, and means for setting said escapement mechanism and said justification settable means.

2. In a typewriting machine, a paper carriage, a carriage escapement mechanism for said carriage, said escapement mechanism being settable to operate at different letter space intervals, justification mechanism to permit said carriage to move relatively to said escapement mechanism, settable means for said justification mechanism comprising a ratchet head for each different letter space interval of the escapement mechanism, a single holding dog cooperating with said ratchet heads, and means for setting said escapement mechanism and for setting said dog relatively to the proper ratchet head.

3. In a device of the class described, the combination of a travelling paper carriage, printing mechanism comprising alphabets of different standard letter spaces selectively settable for use at the printing point, escapement mechanism settable to a plurality of standard letter space movements, justifying mechanism operable to cause said carriage to move increments in addition to the letter space movements of the escapement mechanism, settable devices for setting the justifying mechanism, said settable devices comprising separate means corresponding to each setting of the escapement mechanism, and means to simultaneously set said escapement mechanism to a predetermined letter space interval and said settable devices to correspond to the type alphabet operable at the printing point.

4. In a machine of the class described, the combination of a paper carriage, with printing mechanism including a plurality of alphabets of printing type of different sized characters settable to operate at the printing point, escapement mechanism for the carriage and settable to produce a plurality of series of letter spaces of different widths to correspond to the alphabet in use at the printing point, means for setting said escapement mechanism so that the escapement spaces correspond to the widths of the characters of the alphabet being used for printing, justifying mechanism comprising in part connecting means operatively connecting said escapement mechanism with said carriage, a track-bar cooperating with said connecting means to cause said carriage to move during a portion of its travel in accordance with letter spacing of said escapement mechanism, said justifying mechanism also comprising means operable on said connecting means to permit said carriage to move during the remaining portion of its travel an increment in addition to the letter space movement permitted by the escapement mechanism, said justifying mechanism also comprising settable means provided with a holding member corresponding to each escapement spacing control seting, and means for selecting the proper holding member for the justifying mechanism when said escapement mechanism is set for a particular letter space movement.

5. In a machine of the class described, the combination of a paper carriage, with printing mechanism including a plurality of alphabets of printing type of different sized characters settable to operate at the printing point, escapement mechanism for the carriage and settable to produce a plurality of series of letter spaces of different widths to correspond to the alphabet in use at the printing point, means for setting said escapement mechanism so that the escapement spaces correspond to the widths of the characters of the alphabet being used for printing, justifying mechanism comprising in part connecting means operatively connecting said escapement mechanism with said carriage, a track-bar cooperating with said connecting means to cause said carriage to move during a portion of its travel in accordance with letter spacing of said escapement mechanism, said justifying mechanism also comprising means operable on said connecting means to permit said carriage to move during another portion of its travel an increment in addition to the letter space movement permitted by the escapement mechanism, said justifying mechanism also comprising settable means provided with a ratchet head corresponding to each escapement spacing control setting, and means comprising a holding dog for selecting the proper ratchet head for the justifying mechanism when said escapement mechanism is set for a particular letter space movement.

6. In a typewriting machine, the combination of a travelling paper carriage, an escapement, a rack cooperating with said escapement, a pair of bell cranks pivoted to said carriage, one arm of each of said bell cranks being connected with said rack, a control bar connecting the other arms of said bell cranks, a track parallel to the movement of said carriage, a sine-bar comprising a continuation of said track and being adjustable to angles of inclination, a roller on said control bar adapted to travel on said track and said sine-bar, an operating bar, means carried by said carriage adapted to cooperate with said operating bar when a predetermined point is reached in the travel of said carriage, mechanism operated by said operating bar and adapted to change the inclination of said sine-bar for each letter space movement of said carriage after said predetermined point is reached, tabulating mechanism adapted to release said operating bar from control of said carriage and to release said carriage from control by said escapement for predetermined free travel of said carriage, and means to hold said sine-bar in its adjusted position when said tabulating mechanism is rendered effective.

7. In a typewriting machine, the combination of printing mechanism, a travelling paper carriage, an escapement, a rack cooperating with said escapement, a pair of bell cranks pivoted to said carriage, one arm of each of said bell cranks being rotatively connected with said rack to permit vertical movement between said arms and said rack, a control bar connecting the other arms of said bell cranks, a track parallel to the movement of said carriage, a sine-bar comprising a continuation of said track and being adjustable to angles of inclination, means to adjust justable to angles of inclination, means to adjust said track and said sine-bar relatively to the travel of said carriage, a roller on said control bar adapted to travel on said track and said sine-bar, an operating bar, means carried by said carriage adapted to cooperate with said operating bar when a predetermined point is reached in the travel of said carriage, mechanism operated by said operating bar and adapted to change the inclination of said sine-bar for each letter space movement of said carriage after said prespace movement of said carriage after said predetermined point is reached, tabulating mechanism adapted to release said operating bar from control of said carriage and to release said carriage from control by said escapement for predetermined free travel, ratchet means to hold said sine-bar in its adjusted position when said tabulating mechanism is rendered effective, and devices to release said sine-bar from its adjusted position upon the return movement of said carriage.

8. In a typewriting machine, the combination of a paper carriage, an escapement mechanism, an escapement rack cooperating with said escapement mechanism, a pair of bell cranks pivoted on said carriage and operatively connected with said rack, a control bar connecting said bell cranks whereby a vertical movement of said control bar causes a relative movement between said rack and said carriage, a roller adjustably mounted on said control bar, a track parallel to the travel of said carriage and on which said roller is adapted to travel during a portion of the movement of said carriage, a sine-bar at the end of said track and comprising a continuation thereof for said roller, and means to set said sine-bar at predetermined angles of inclination to cause said control bar to move downwardly as said roller travels on said sine-bar when said carriage travel brings said roller onto said sine-bar thereby causing said carriage to be moved relative to said rack an increment of movement for each letter space movement of said carriage.

9. In a typewriting machine, the combination of printing mechanism, a paper carriage, an escapement mechanism, an escapement rack cooperating with said escapement mechanism, a pair of bell cranks pivoted on said carriage and operatively connected with said rack, a control bar connecting said bell cranks whereby a vertical movement of said control bar causes a relative movement between said rack and said carriage, a roller adjustably mounted on said control bar, a track parallel to the travel of said carriage and on which said roller is adapted to travel during the movement of said carriage while an unjustified line is being typed by said printing mechanism, a sine-bar at the end of said track and comprising a continuation thereof for said roller, and means to set said sine-bar at predetermined angles of inclination to cause said control bar to move downwardly as said roller travels on said sine-bar when said carriage travel brings said roller onto said sine-bar, thereby causing said carriage to be moved relatively to said rack an increment of movement for each letter space movement of said carriage when said carriage is moving during the typing of a justified line.

10. In a typewriting machine, the combination of a paper carriage, an escapement mechanism, an escapement rack cooperating with said escapement mechanism, bell cranks pivoted on said carriage and having one pair of arms pivotally connected with said rack, a control bar extending between and connecting the other pair of arms of said bell cranks, a roller mounted for adjustable movement on said control bar, a track parallel to the movement of said carriage, a sine-bar comprising a continuation of said track whereby said roller travels upon said track and said sine-bar during the movement of said paper carriage, an operating bar, a block carried by said operating bar, a pair of dogs adjustably mounted on said carriage and adapted to cooperate with said block to cause an endwise movement of said operating bar during a predetermined portion of travel of said carriage, and means connected with said operating bar and constructed and arranged to adjust the angle of inclination of said sine-bar when said operating bar is moving in the direction of travel of the carriage for letter spacing.

11. In a typewriting machine, the combination of a paper carriage, an escapement mechanism, an escapement rack cooperating with said escapement mechanism, bell cranks pivoted on said carriage and having one pair of arms pivotally connected with said rack, a control bar extending between and connecting the other pair of arms of said bell cranks, a roller mounted for adjustable movement on said control bar, a track parallel to the movement of said carriage, a sine-bar comprising a continuation of said track whereby said roller travels upon said track and said sine-bar during the movement of said paper carriage, an operating bar, a block carried by said operating bar, a dog adjustably mounted on said carriage and adapted to cooperate with said block to cause an endwise movement of said operating bar during a predetermined portion of travel of said carriage, means connected with said operating bar and constructed and arranged to adjust the angle of inclination of said sine-bar when said operating bar is moving in the direction of travel of the carriage for letter spacing, and means to release said sine-bar from said adjustment when the carriage is returned.

12. In a typewriting machine, the combination of a paper carriage, an escapement mechanism, a rack cooperating with said escapement mechanism, bell crank means pivoted on said carriage and operatively connected with said rack whereby rotative movement of said bell crank means causes a relative movement between said rack and said carriage, a sine-bar adapted to control said bell crank means during a portion of the travel of said carriage, and mechanism operated by said carriage to automatically set the inclination of said sine-bar during a portion of the travel of said carriage.

13. In a typewriting machine, the combination of a paper carriage, an escapement mechanism, a rack cooperating with said escapement mechanism, bell crank means pivoted on said carriage and operatively connected with said rack whereby rotative movement of said bell crank means causes a relative movement between said rack and said carriage, a sine-bar adapted to control said bell crank means during a portion of the travel of said carriage, mechanism operated by said carriage to automatically set the inclination of said sine-bar during a portion of the travel of said carriage, and means to hold said sine-bar in set position while the movement of the carriage is under control of said sine-bar.

14. In a typewriting machine, the combination of a travelling paper carriage, an escapement mechanism, a rack cooperating with said escapement mechanism, a pair of bell cranks pivotally mounted on said carriage and having arms cooperating with said rack whereby said bell cranks constitute the operating connection between said rack and said carriage, a control bar connecting the other pair of said bell crank arms, a roller mounted on said control bar, a track parallel to the movement of said carriage, a sine-bar pivoted on the end of said track and constituting a continuation thereof, said roller being adapted to travel upon said track and said sine-bar, means to adjust said track and said sine-bar relative to the travel of said carriage, and means to hold said sine-bar at a predetermined inclination whereby said carriage receives justification movement when said roller is travelling upon said sine-bar.

15. In a machine of the class described, the combination of a paper carriage, printing mechanism comprising a plurality of alphabets of printing types of different size characters settable to operate at the printing point, escapement mechanism settable to produce a plurality of series of letter spaces of different widths to correspond to the alphabet in use at the printing point, means for setting said escapement mechanism so that the escapement spaces correspond to the width of the characters of the alphabet used for printing, justifying mechanism to permit said carriage to move an increment in addition to the letter space movement permitted by the escapement mechanism, said justifying mechanism comprising a ratchet head corresponding to each escapement spacing control setting, and means to select the ratchet head corresponding to the escapement control setting when said escapement mechanism is set.

16. In a typewriting machine, the combination of printing mechanism, a paper carriage, an escapement mechanism, an escapement rack cooperating with said escapement mechanism, a pair of bell cranks pivoted on the carriage and operatively connected with said rack, a control bar connecting said bell cranks whereby a vertical movement of said control bar causes a relative movement between said rack and said carriage, a roller mounted on said control bar, a sine-bar adapted to be inclined relative to the travel of said carriage, said roller being adapted to travel on said sine-bar, and means to set said sine-bar at predetermined angles of inclination to cause said control bar to move downwardly as said roller travels on said sine-bar during the travel of said carriage, thereby causing said carriage to be moved relatively to said rack an increment of movement for each letter space movement of said carriage.

17. In a printing apparatus, carriage means to carry a print receiving surface, said carriage means being operable to bodily shift a certain prescribed distance for each character impression made on said surface, a fixedly mounted escapement mechanism, a line justifying mechanism adapted to vary the distance through which said carriage means moves for each character impression, said line justifying mechanism comprising in part a pivoted sine bar and also connecting means between the sine-bar and the carriage means, and means responsive to the position assumed by said carriage means within a predetermined portion of its range of movement and operable to control the sine-bar of said justifying mechanism in accordance with the position of the carriage means.

18. In a printing apparatus, carriage means to carry a print receiving part operable to advance intermittently as successive characters are imprinted thereon, a fixedly mounted escapement mechanism, a line justifying mechanism for varying the line lengths of the character imprinted on said part, said justifying mechanism comprising in part a pivoted sine-bar and also connecting means between the sine-bar and the carriage means, and means responsive to predetermined positions of said part in its advancement for controlling said justifying mechanism and causing the justifying mechanism to vary the line lengths of characters in accordance therewith.

19. In a printing apparatus, carriage means to carry a print receiving part movable along a given path as successive characters are imprinted thereon, a fixedly mounted escapement mechanism, a line justifying apparatus adapted to control the movement of said carriage means so as to vary the line length of any given set of characters printed thereon, said line justifying apparatus comprising in part a pivoted sine-bar and also connecting means connecting said sine-bar and said carriage means, and means responsive to the position of said carriage means within a certain predetermined range of its total path of movement for setting said justifying mechanism, said means setting said justifying mechanism for controlling the movements of said carriage means after the said carriage means has passed said range in its path of movement.

20. In a printing apparatus, a carriage for carrying a print receiving part adapted to advance in a series of steps along a given path of movement as character impressions are made thereon, a fixedly mounted escapement mechanism, means for positioning said carriage at a certain place along said path of movement for starting a line of characters, justifying mechanism for controlling the movement of said part during the printing of said line of characters in order to vary the line length thereof, said justifying mechanism comprising in part a pivoted sine-bar and also connecting means between said sine-bar and said carriage, and means responsive to certain predetermined positions of said carriage in its path of movement prior to said starting place for regulating said justifying mechanism.

21. In a printing apparatus, a carriage adapted to advance along a given path of movement, a fixedly mounted escapement mechanism, means positioning said carriage intermediate the extremes of its path of movement for starting the printing of a line of characters, means controlling the movement of said carriage during the printing of said line of characters, and means responsive to certain positions of said carriage within a prescribed range of movement in advance of said starting position for regulating the last mentioned control means in accordance with the position of the carriage in this range of movement, said last mentioned control means comprising in part a pivoted sine-bar and also connecting means between said sine-bar and said carriage.

22. A printing apparatus comprising, in combination, a carriage mounted for movement along a given path, mechanism for imparting step-by-step advance to said carriage along said path of movement, said mechanism comprising in part a fixedly mounted escapement mechanism, means for varying the step-by-step character of advance of said carriage, and means operatively associated with said carriage and with the said first means and adapted in response to certain advancements of the carriage to progressively alter the control of said first means over the step-by-step character of the carriage advance, said last mentioned means comprising in part a pivoted sine-bar.

23. In a printing apparatus, a line justifying mechanism for varying the line lengths of a given set of characters, said line justifying mechanism comprising in part a pivoted sine-bar and connecting means, a carriage connected to said connecting means and operable to advance in step-by-step manner as successive character printing operations are performed, an escapement mechanism mounted against lateral movement, means responsive to the advance of said carriage within a certain range of its total length of movement to proportionately adjust the regulation of said justifying mechanism, and means for presetting said sine-bar of said justifying mechanism in adjusted position when said carriage is in said range of movement.

24. In a machine of the class described, the combination of printing mechanism, a paper carriage to carry the material being printed upon, an escapement mechanism, a rack bar operatively connected with said escapement mechanism and to which said escapement mechanism allows an intermittent movement, justification mechanism comprising in part connecting means operatively connecting said rack bar with said paper carriage to communicate movement from said rack bar to said carriage, said justification mechanism also comprising a pivoted sine-bar for controlling said connecting means to cause a relative movement between said carriage and said rack bar during letter space movement of said carriage, a track bar cooperating with said connecting means to prevent relative movement between said carriage and said rack bar when the printing mechanism is operated during a portion of the travel of the carriage, and means for setting said sine-bar to enable the same to be effective to cause a relative movement between said carriage and said rack bar during the further movement of said carriage.

25. In a machine of the class described, the combination of a printing mechanism, a paper carriage to carry the material being printed upon, an escapement mechanism, a rack bar operatively connected with said escapement mechanism and to which said escapement mechanism allows an intermittent movement, justifying mechanism comprising in part connecting means operatively connecting said rack bar with said carriage to permit relative movement between said rack and said carriage, said justifying mechanism also comprising a sine-bar for controlling said connecting means to cause a relative movement between said carriage and said rack bar during letter space movement of said carriage, a track bar for controlling said connecting means to cause said rack bar and said carriage to move in unison while an unjustified line is typed when said printing mechanism is operated during a portion of the travel of the carriage, and means to automatically set said sine-bar during the typing of a portion of an unjustified line to cause a relative movement between said carriage and said rack bar while a justified line is being typed during the remainder of the movement of the carriage.

26. In a machine of the class described, the combination of printing mechanism, a paper carriage to carry the material being printed upon, an escapement mechanism, a rack bar operatively connected with said escapement mechanism and to which said escapement mechanism allows an intermittent movement, justifying means comprising in part connecting means operatively connecting said rack bar with said paper carriage to permit relative movement between said rack bar and said paper carriage, said justifying means also comprising a sine-bar for controlling said connecting means to cause a relative movement between said paper carriage and said rack bar during letter space movement of said paper carriage, a track bar for controlling said connecting means to cause said rack bar and said paper carriage to move in unison while an unjustified line is typed when said printing mechanism is operated during a portion of the travel of the paper carriage, means to automatically set said sine-bar during the typing of a portion of said unjustified line to cause a relative movement between said rack bar and said paper carriage while a justified line is being typed during the remainder of movement of said paper carriage, and means to reset said sine-bar to normal position when said paper carriage is being returned to starting position.

27. In a machine of the class described, a paper carriage mounted for letter space movement, an escapement mechanism, an escapement rack connected with the escapement mechanism, justifying mechanism comprising in part connecting means operatively connecting said escapement rack with said carriage whereby said carriage may be moved independently of said rack, printing mechanism, a track bar cooperating with said connecting means to prevent relative movement between said carriage and said rack whereby an unjustified line may be written on said paper carried by said carriage, said justifying mechanism also comprising settable means cooperating with said connecting means, and setting means for automatically setting said settable means while a portion of said unjustified line is being written.

28. In a machine of the class described, a paper carriage mounted for letter space movement, an escapement mechanism, an escapement rack connected with the escapement mechanism, justifying means comprising in part connecting means operatively connecting said escapement rack with said carriage whereby said carriage may be moved independently of said rack and also a settable sine-bar cooperating with said connecting means, printing mechanism, a track bar substantially parallel with movement of the said carriage and cooperating with said connecting means to prevent relative movement between said carriage and said rack, and setting means for setting said sine-bar to vary the movement of said carriage relative to said rack whereby a justified line may be written.

29. In a typewriting machine, the combination of printing mechanism, a paper carriage, a fixedly mounted escapement mechanism, carriage stoppage devices to determine at least two columnar positions for movement of the carriage, justification mechanism adapted to add an increment of movement to the carriage in addition to that allowed by the escapement mechanism, and means to set said justification mechanism during the typing of a portion of an unjustified line in the first columnar position so that said justification mechanism is effective upon a retyping of the same line in the second columnar position to produce a justified line.

30. In a typewriting machine, the combination of printing mechanism, a paper carriage, a fixedly mounted escapement mechanism, carriage stop devices to determine at least two columnar positions for movement of the carriage, justification mechanism adapted to add an increment of movement to the carriage in addition to that allowed by the escapement mechanism, and means operated by the movement of the carriage to set said justification mechanism during the typing of a portion of an unjustified line in the first columnar position so that said justification mechanism is effective upon a retyping of the same line in the second columnar position to produce a justified line.

CHARLES W. NORTON.

CERTIFICATE OF CORRECTION.

Patent No. 2,263,642. November 25, 1941.

CHARLES W. NORTON.

It is hereby certified that error appears in the printed specification of the above numbered patent requiring correction as follows: Page 9, first column, line 5, claim 18, for "part" read --carriage means--; line 6, same claim, before "justifying" insert --sine-bar of said--; and that the said Letters Patent should be read with this correction therein that the same may conform to the record of the case in the Patent Office.

Signed and sealed this 6th day of January, A. D. 1942.

(Seal)

Henry Van Arsdale,
Acting Commissioner of Patents.